United States Patent

[11] 3,568,142

| [72] | Inventors | Ralph A. Landrum, Jr.;<br>John L. Shanks, Tulsa, Okla. |
|---|---|---|
| [21] | Appl. No. | 609,527 |
| [22] | Filed | Jan. 16, 1967 |
| [45] | Patented | Mar. 2, 1971 |
| [73] | Assignee | Pan American Petroleum Corporation<br>Tulsa, Okla. |

[54] MULTIPLE FREQUENCY SURVEYING SYSTEM
7 Claims, 4 Drawing Figs.

| [52] | U.S. Cl. | 340/15.5 |
|---|---|---|
| [51] | Int. Cl. | G01v 1/28 |
| [50] | Field of Search | 181/0.5 |
| | | (C); 340/15.5 (RTC), 15.5 (CF), 15.5 (GC) |

[56] References Cited
UNITED STATES PATENTS

| 3,066,754 | 12/1962 | Johnson | 340/15.5(CF) |
|---|---|---|---|
| 3,182,743 | 5/1965 | McCollum | 340/15.5(RTC) |
| 3,259,878 | 7/1966 | Mifsud | 340/15.5(RTC) |
| 3,327,805 | 6/1967 | Glazier et al. | 340/15.5(GC) |
| 3,353,624 | 11/1967 | Redding | 340/15.5(RTC) |
| 3,284,769 | 11/1966 | Skelton | 181/.5 |

Primary Examiner—Rodney D. Bennett, Jr.
Assistant Examiner—Daniel C. Kaufman
Attorney—Paul F. Hawley ABSTRACT: A seismic surveying method utilizes a vibratory source emitting a succession of differing frequency sine waves. Received waves after suitable amplification are passed through a group of narrow filters which separate the various frequency components. After suitable time delays, these components are recombined to present a record similar to that obtained from an explosive single source.

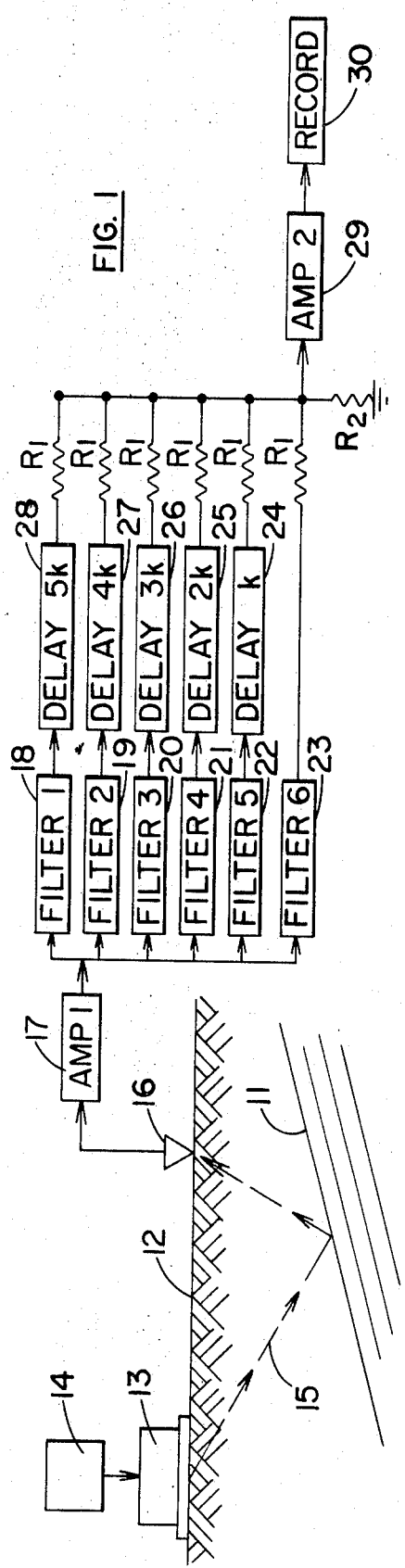
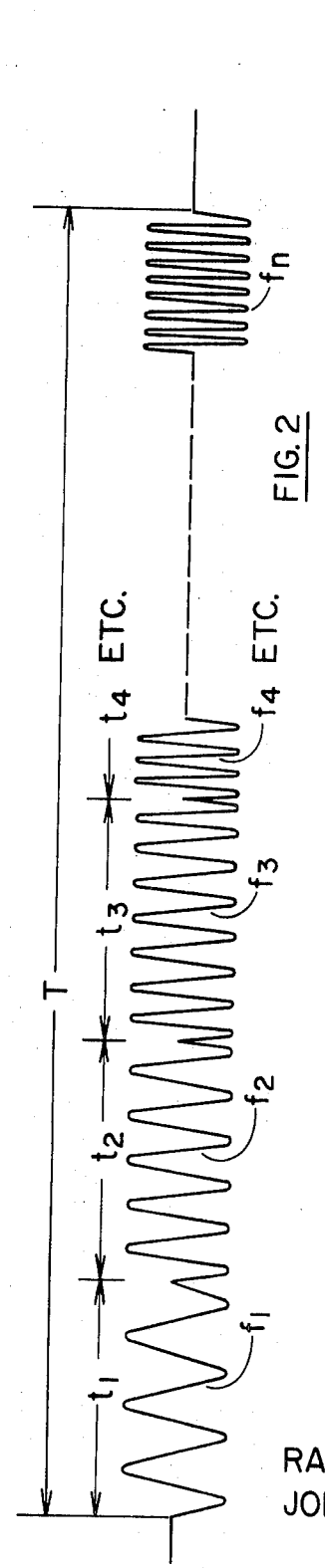

RALPH A. LANDRUM, JR.
JOHN L. SHANKS
INVENTORS.

BY Paul F Hawley

ATTORNEY.

MULTIPLE FREQUENCY SURVEYING SYSTEM

BACKGROUND

This invention specifically pertains to the field of seismic surveying, though with appropriate modifications apparent to those skilled in this and related art, it can be applied to aerial navigation and similar systems based on so-called echo ranging, in which a particular signal is generated and the time for the echo to return to a receiving station is determined. In the particular invention herein described, the generated or transmitted signal is made up of a sequence or succession of sets of waves, each set consisting of a number of cycles which are substantially identical (the period of at least some of the cycles being different from that in other sets), the received signal being usually amplified to compensate for attenuation, scattering, etc., the received signal narrowly filtered by a plurality of filters, each tuned to the fundamental frequency of only one of the sets of waves, and the filtered outputs appropriately delayed and combined. The resultant of the combined, delayed outputs of the various filters is displayed as an output record normally displayed as a function of time, i.e., as a time record, using either variable amplitude or variable density of the recorded trace. It is found that the resultant record, if a considerable number of sets of waves are used in the transmitted signal, will display the characteristics of a received wave from a source consisting essentially of a single pulse of high amplitude and very short time duration. As compared to the records obtained when using such a transmitted pulse, however, in general our records tend to show considerably higher signal-to-noise ratio.

Seismic surveying using a single pulse (usually due to explosion of a dynamite charge) has been carried out for a long period of time. The elastic waves propagated through the earth are reflected at elastic discontinuities. These reflected waves can be received and recorded at geophones placed some distance from the source. Generally, reflections are detected visually by the arrival of waves at a plurality of geophone locations essentially simultaneously.

More recently, vibratory sources instead of impulses have been employed with some success. For example, the Vibroseis system, of which U.S. Pat. No. 2,688,124 to Doty et al. is typical, employs a unique signal usually consisting of a variable frequency vibration applied near the surface of the ground for a substantial period of time, for example, 5 seconds. This system makes use of the fact that the waves received at the various geophone locations set up in some kind of a spread are ultimately cross-correlated with a signal representing the vibration transmitted into the ground to produce a correlated signal in which the various reflected waves appear as wavelets i.e., pulses having relatively short duration and considerable amplitude. For suitable resolution in this system, it is stated that the transmitted signal should be unique, i.e., no two cycles of the vibration should be of essentially the same frequency.

A different approach is found in the U.S. Pat. No. 3,182,743 to McCollum in which one after another, a series of wave trains of an essentially sinusoidal waveform are transmitted into the ground by some sort of a vibrator, the waves received due to each wave train being reproducibly recorded at each geophone location before the next frequency sine wave train is transmitted, then the process repeated. Ultimately, the received waves due to each wave train are combined together in such a fashion that one of the central half cycles alone is in phase. The resultant waves after combination appear essentially like those obtained from the last step of the Vibroseis system, or like those of the systems employing a dynamite explosion.

Mifsud U.S. Pat. No. 3,259,878 also teaches generation of continuous waves in bursts of seismic energy, each burst being at a different frequency, and determining form the transmitted and received seismic waves the relative amplitude and phase between these waves, then subsequently setting up equivalent signals with the appropriate amplitude and phase changes, which are added together to produce a composite reflected signal. This is rather akin to the method taught by the Smith et al. U.S. Pat. No. 3,291,297.

The McCollum, Mifsud, and Smith et al. patents have an advantage over the Vibroseis type of exploration in that no cross-correlation step is required. On the other hand, these patents, teaching essentially sine wave type signaling, have generally a tremendous economic disadvantage in that in all of them a wave train of a particular frequency must be generated and then received and a record (normally reproducible) made of this reception before the next signal can be transmitted. The travel time of seismic waves in the earth may be in the order of six to eight seconds. Accordingly, if a wave train of one frequency lasting $x$ seconds is generated, the next signal cannot be applied until a time which theoretically cannot be less than $x + 6$ to 8 seconds. Substantially any of these wave train type of signaling systems thus far developed require generation of at least 10 wave trains of varying frequency so it is seen that the overall time required before one can complete a single survey is much greater than when using either the explosion-pulse seismic survey or the Vibroseis type survey.

SUMMARY

We have developed a process for seismic surveying in which the transmitted signal which is generated usually near the surface of the earth is made up of a series or succession of wave trains, each wave train or set consisting of a plurality of substantially identical cycles (preferably sinusoidal) and of an integral number of half cycles, the frequency of the various sets being different but preferably being related to each other by a common integer. The sets are generated one after another so that they are continuous. This does not mean that they necessarily are contiguous, i.e., one wave train may subside briefly before the next is generated, but if so, the interval or quiet time between successive sets is preferably less than the time of the wave train itself. Thus at any one time in the interior of the earth at a short time after the completion of the transmitted signal there will be present in the earth wave trains of widely differing frequencies. The received waves are picked up by a geophone (preferably by a plurality of geophones arranged in any of the well-known spreads), the received signal amplified, and the amplified signal transmitted to a plurality of filters, each tuned to the fundamental frequency of one of one of the sets of waves in the succession in the transmitted signal. The outputs of the filters are combined after an appropriate delay for each frequency component such that one-half cycle of each of the filtered sets from any particular reflection will essentially be in phase with the equivalent half cycle of each of the other sets.

It should be pointed out that this invention is equally usable if the received amplified signal is broken up into a succession of sets which are delayed appropriately (as described below) and the delayed signals are filtered. In other words, the arrangement discussed above of filtering followed by time delay is essentially equivalent to time delaying followed by filtering.

This gives the benefit of use of a sinusoidal type of wave generation, which is advantageous both from the standpoint of the kind of vibrator that can be employed and because it enhances the signal-to-noise ratio obtainable through the filters. It also gives the advantage over the previous sine wave prospecting systems suggested in that the wave trains can be transmitted in succession with a relatively small delay (ideally zero) between adjacent sets, so that a minimum time need be spent in transmission and reception of the seismic data. This permits a greater number of locations to be surveyed in a given period of time. the time duration of the set itself. Each set consists of a plurality of substantially identical cycles which can be, for example, a sine wave, a so-called square wave or the like. The program selector 14 is arranged to drive the vibrator 13 such that each set of waves applied to the earth will be an integral number of half cycles. Preferably each set starts at zero amplitude. It is to be emphasized that the sets may not be of uniform duration, although the simplest embodiment of this invention utilizes a uniform preselected time interval for each such set. Again, the time interval between adjacent sets must be known, but is not necessarily constant, although in the most simple and preferred embodiment the time between adjacent sets is negligible, i.e., these sets are not only continuous but contiguous. Such an arrangement, for example, is shown in the time diagram of FIG. 2 in which a first set of sine waves of frequency $f_1$ is applied by vibrator 13 to the ground for a period $t_1$, immediately following which during time $t_2$, a second set of sine waves at a different frequency $f_2$ is applied, and so on. In this case the total duration of the signal T is equal to the summation of the sets of sine waves $t_1 + t_2 + t_3$ + etc. As mentioned above, it is possible to use waveforms other than sinusoidal for each set, provided that the cycles forming each individual set are substantially identical. Thus, for example, we have employed square wave excitation of the ground, and find that in some field operations this is successful. However, we prefer to employ sine waves with minumum harmonic content wherever possible.

It should be noted that adjacent sets of waves in FIG. 2 are shown commencing with opposite polarity. This is simply for ease in graphical representation. Ordinarily we prefer to use at least substantial identity of polarity between the last half cycle of one set and the beginning half cycle of the next set. We later show how to combine the various sets of such a seismic signal.

This generated signal propagates through the earth in all directions as is well known to those skilled in this art. The various waves disperse and attenuate with distance. Some downward-going signals, such as that following path 15, encounter reflecting beds such as bed 11, and part of the signal energy

BRIEF DESCRIPTION OF THE DRAWINGS

Suitable modifications and improvements are discussed in this specification which is to be read in conjunction with the attached drawings. These drawings form a part of the specification and illustrate certain preferred embodiments of our invention. In these drawings the same reference number in different FIGS. refers to the same and/or analogous part.

FIG. 1 shows in diagrammatic form one embodiment of this invention.

FIG. 2 illustrates the type of vibration generated in the embodiment shown in FIG. 1.

FIG. 3 illustrates a second type of generated signal which can be profitably used in this invention.

DESCRIPTION OF THE PREFERRED EMBODIMENTS

Figure 4:
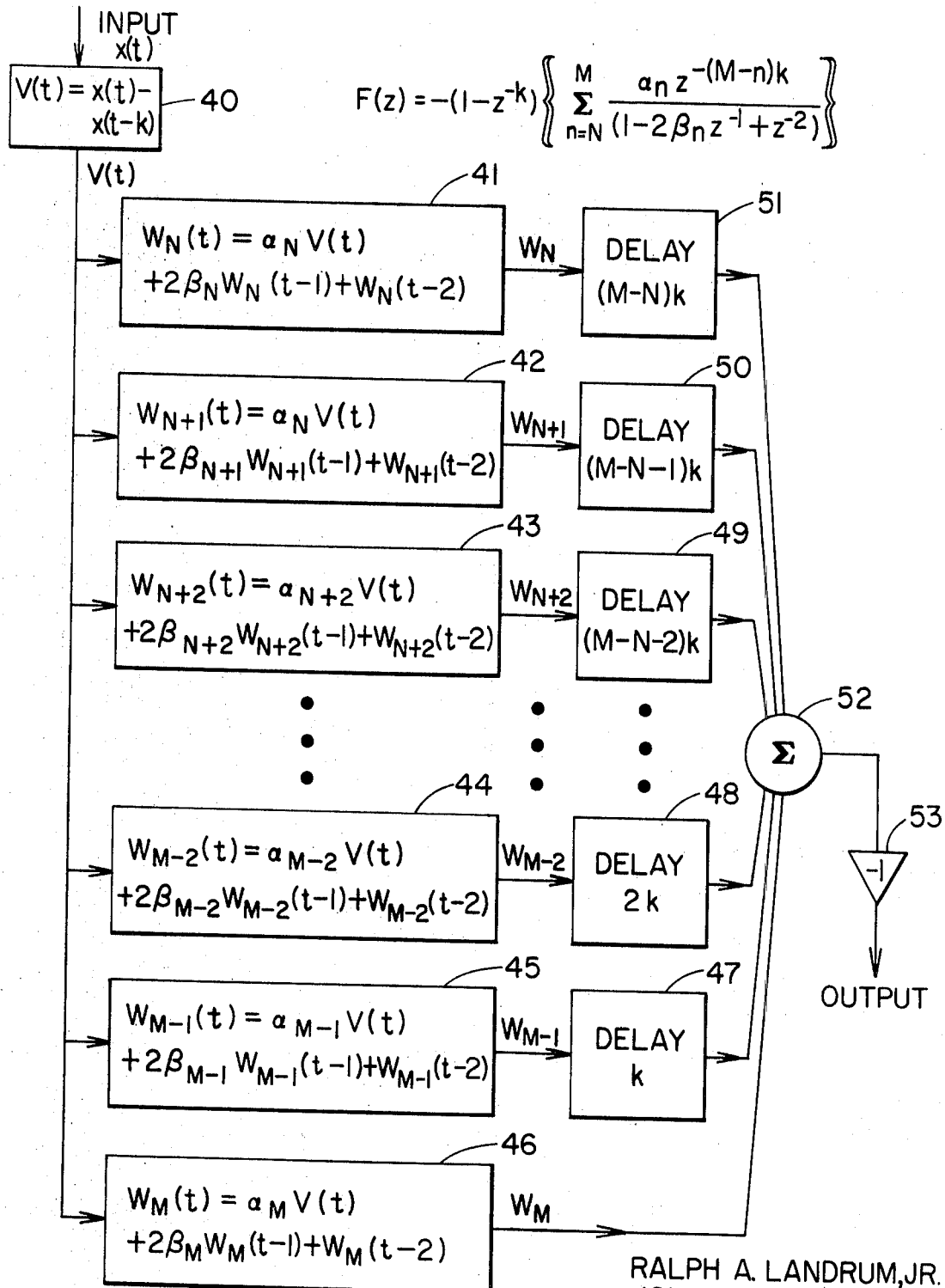
FIG. 4 shows a discrete processing flow diagram equivalent to that shown in FIG. 1 to accomplish the filtering and time delay functions required in this invention.

It is to be understood that basically this invention concerns the type of vibratory signal applied to the earth, and the processing of the received signal at at least one and preferably at a large plurality of points removed from the source. As such, the geometry of the source-receiver locations does signal form any basic requirement for this invention and any arrangement which has otherwise been found suitable with any other type of source and receiver may be employed in this system. In FIG. 1 we have shown one basic embodiment of the invention applied to determine the depth of a reflecting bed 11 beneath the surface of the earth 12. A vibrator 13 of a type which can be arranged to be driven to produce a predetermined seismic signal in the earth is shown applied to the surface of the earth 12 and responsive to a program selector or pilot signal generator 14. The vibrator must be capable of generating in the earth under it a succession of sets of waves, each succeeding the one preceding it by preferably not more than a short time interval, which is at least less than is reflected back towards the surface 12. Other energy from vibrator 13 propagates along the surface 12 in the form of bound or surface waves.

The seismic signal set up by vibrator 13 is picked up at one and preferably at a plurality of reception points forming the spread. At each such reception point a vibration detector, such as a geophone 16, produces an electric signal in accordance with the seismic waves impinging upon it. This signal is amplified by an amplifier 17 until it reaches a desired level. The amplified signal is then passed to a plurality of wave filters 18—23 preferably equal in number to the number of sets of waves in the generated signal. Each of these wave filters is tuned to the fundamental frequency of one only of the sets of waves in the generated signal. Each such wave filter is narrow, that is, arranged to pass primarily the center frequency (such as $f_{-1}$) of its set and to pass as little as possible of the center frequency component of the other sets (as $f_2, f_3$, etc.). This is particularly desirable since, as is well known, the signal transmitted by the geophone 16 contains not only desired signals from the earth, but also undesirable noise signals generated by all other vibrating sources in the neighborhood and it is desired to emphasize the signal-to-noise ratio as much as possible.

It is apparent that each of the wave filters 18—23 is filtering the received signal simultaneously with all of the other wave filters and, accordingly, since the signals received by the geophone 16 can contain at any particular time a widely varying frequency content, due to both the direct and reflected waves, these filters serve a very useful purpose in segregating out the particular frequency components from the various sets of waves.

For clarity in this presentation, it will be temporarily assumed (though actually not the case) that these wave filters introduce no time delay in the signals passing through them. Accordingly, for the generated signal following path 15 (for example) the outputs of the wave filters 18—23 should have output for a time corresponding to the time duration of the set containing the frequency to which the filter is responsive. Thus, if the signals were of the type shown in FIG. 2 with filter 18 tuned to center frequency $f_1$ and so on, the output of filter 18 to the signals transversing wave path 15 should be present for at least a time $t_1$, during which the output of the second filter 19 tuned to frequency $f_2$, and due to signals along wave path 15, should be small. For ease in interpreting the resultant record, it is desirable to recombine in a particular, predetermined fashion the outputs from the various filters so that the resultant record very closely resembles that ideally produced by applying an impulse of seismic energy, that is, a signal of considerable amplitude but very short time duration. In order to accomplish this we recall that the Fourier analysis of an impulse is a theoretically infinite number of sine waves of equal amplitude and different frequency, all of which add up to produce a pulse at one instant since one half cycle of each component is in phase at this instant, and add up essentially to zero at all other times. This can be approximated when using a set of waves of different frequency which are of finite amplitude only over a finite interval of time by adding up these waves such that one-half cycle of each component are in phase while at all other times the other half cycles of the sets are not in phase and essentially add up to zero. A good discussion on this is found in many places, one example being that in the McCollum U.S. Pat. No. 3,182,743. Accordingly, we sum up the outputs of the wave filters 18—23 only after applying appropriate time delays.

Many systems are known for summing up varying outputs; the one shown in FIG. 1 involves so-called summing resistors. The wave filter having a frequency $f_n$, the last set in the generated signal, is, as shown in FIG. 1, not delayed at all but is summed by being passed into a large summing resistance $R_1$ which is in series with a relatively small summing resistor $R_2$. The output of the wave filter 22 for the set immediately preceding the last set in the generated signal is delayed in this ideal case by a delay of $k$ seconds by a time delay 24. This time delay mechanism may be any of those well known for delaying a wave without introducing appreciable distortion, such as a magnetic recorder and reproducer using a traveling magnetic medium, on which the recording and reproducing heads are separated by a distance which produces a desired time delay in the output. Acoustic and electric delay lines are also available for this same purpose. In the case illustrated in FIG. 1, the time delay $k$ employed using the signal in FIG. 2 is chosen such that preferably one of the central half cycles of the delayed signal on the output of unit 24 is in phase with one of the central half cycles of the output of filter 23. Thus, assuming that the output of filter 23 is for the set of signals of frequency $f_n$, the time delay $k$ for unit 24 (which corresponds to filter 22 tuned to the next preceding frequency $f_{-n-1}$) should be one-half $(t_n + t_{n-1})$. Here $t_{n-1}$ is the duration of the $n-1$ set of waves. If, as in the example shown in FIG. 2, the duration of each set is the same, this time is the time $t_1$. Similarly, the output of filter 21, tuned to frequency $f_T-2$ should be delayed so that a central half cycle of this set is in phase with a central half cycle from the first set also so that the delay of unit 25 should be one-half $(f_n + t_{n-2}) + t_{n-1}$. In this case, this is $2t_1$. It is therefore apparent that if the wave filters are arranged successively to filter each the next higher frequency than the previous filter, and in the generated signal the lowest frequency signal is followed in turn by the higher frequencies, then the ideal time delays should be, respectively, $k = t_n$ (or $t_1$), then $2k$, $3k$, $4k$, etc.

The output of all delay mechanisms are summed up, for example, applied to a summing resistor, preferably equal in resistance to $R_1$. As shown in FIG. 1, the other side of all of these resistors $R_1$ is connected to the common resistance $R_2$ of low resistance compared to that of $R_1$. (This arrangement is one of several which produces across an output, such as resistor $R_2$, a voltage which is the summation of the instantaneous voltages at the output of all of the time delay mechanisms 24—28.) Accordingly, the signal across $R_2$ is the algebraic sum of the outputs of the filters after appropriate delays of each such filter output by a preselected time interval such that one-half cycle of each of the sets corresponding to one wave path, such as path 15, is in phase, while generally all other half cycles are out of phase and tend to cancel. The degree of cancellation depends upon the number of sets employed, the frequencies of the various sets and the time duration of each set. We prefer to employ at least 10 sets of different frequency, although in some cases less may be employed.

Ordinarily the output voltage across common resistance $R_2$ is low and should be suitably amplified by a second amplifier 29 before the amplified signal is recorded in recorder 30. This recorder may be any of the conventional types of seismic recorders now employed, for example, the variable density or variable amplitude type or, if desired, a reproducible recorder such as a multitrace magnetic recorder may be employed if further signal processing is required.

The idealized signal shown in FIG. 2 shows each initial half cycle of substantially the same amplitude as that of the other half cycles of the set. It is highly desirable to have the initial polarity of substantially one-half of the total number of outputs from the filters opposite to that of the other half. If the filter outputs are all poled in phase, then the transmitted signal should have half the sets of initial opposite polarity. However, if it is desired (as usually is the case) to have the transmitted signal with identical initial polarity, half the filter outputs can be reversed.

It should be pointed out that in actual field practice the amplitude of the first few half cycles of each set is usually less than that of the remaining half cycles, i.e., the wave builds up during the set. In this case the requirement as to polarity is relatively unimportant. The reason for this polarity requirement, of course, is that this insures that when the sets are combined after appropriate time delays, as discussed above, the half cycles that will be in phase will not be the initial half cycles.

While the signal of the type shown in FIG. 2 is theoretically excellent and is preferable when it can be accomplished, or at least approximated, it is possible to depart considerably from this signal and still accomplish the purposes of our invention.

For example, as shown in FIG. 3, there may be occasions in which the sets of waves are contiguous but not continuous, that is, there may be intervals of no substantial wave amplitude between adjacent sets of waves. Here there is a time interval $t_{o1}$ between the times $t_1$ and $t_2$ and similar interval $t_{o2}$ between the second and third set, etc. This simply requires that the time delay in one of the time delay units (24 for example) is made sufficiently great to compensate for this time between the last two sets. In other words, the time delay incorporates all quiet periods between the initial set and the set to which the associated filter is tuned.

Also, the expressions developed so far have ignored the fact that the various filters 18—23 may have inherently differing delay times themselves, which also can be appropriately compensated for in the delay mechanisms.

Again, it may be that it is desired to combine the filtered outputs such that another half cycle of the various sets is emphasized rather than one near the center of each set. In this case the time delay for each delay mechanism is the time from that half cycle in the one set until that half cycle in the appropriate succeeding set, as will be readily apparent to one skilled in this art. A third point that can be made in connection with FIG. 3 is that the shape of the sets of signals shown represent the more realistic onset and ultimate termination of such sets, rather than the idealized constant amplitude form shown in FIG. 2. This is not a real disadvantage; it simply means that when the sets are superimposed, the expected cancellation at the initial and terminal parts of each set will be accomplished more readily than in the arrangement shown in FIG. 2. Accordingly, it is not necessary to adjust the voltage from program selector 14 so that vibrator 13 puts into the ground an initial half cycle as strong as all subsequent half cycles in each set.

It is a known fact that sinusoidal seismic waves passing between two points in the earth do not experience equal attenuation at differing frequencies. On the other hand, maximum benefits from the system indicated in FIG. 1 and so far described are secured when the amplitude of the various sets combined are of essentially the same amplitude. To a degree, this result can be secured by incorporating adjustable gain amplifiers between each wave filter and the associated time delay unit. However, while this can be done, it is more advantageous to compensate at least in part for the variable attenuation with frequency in the earth by one of two systems. Either one applies an increased amplitude of signal in those sets at which frequency greater than average attenuation is expected, and preferably adjust received signal amplitude to be at least roughly directly proportional to the expected attenuation, so that the received sets along each reflection path are about the same order of magnitude as to amplitude, or we may apply signals of about the same order of amplitude but apply those for a time the duration of which is approximately inversely proportional to the attenuation. In practice, this can be accomplished by causing the vibrator 13 to put out sets of substantially equal duration, but from time to time apply again a set of the same frequency. Thus, if low frequency $f_o$ is known to be attenuated, say, four times that many sets of other frequencies, one may apply early in the total transmitted signal a set of center frequency $f_o$, apply it again after five other sets, again apply it after some more sets, and again near the end of the total signal. In the summation, four additions will be made of this frequency set. Of course, one can combine both systems if desired.

It should be apparent to those skilled in this art that different systems for filtering may be employed than those already discussed. Thus, for example, one may employ filtering in the time domain to accomplish exactly the same purpose as filtering in the frequency domain, so long as the output from the geophone (or set of geophones if several are connected to give a common output, as is frequently the case) is such that the processing involves narrow filtering simultaneously for each of the desired frequencies generated by the initiating signal.

No mention has been made as yet as to what fundamental frequencies should be employed for the various sets. Fourier analysis indicates that we employ an integral number of half cycles for each set (or wave train). Preferably the frequency of each set is related to the next lower frequency by a common integer. These requirements are essentially the same as those pointed out in the McCollum U.S. Pat. No. 3,182,743.

Another good arrangement for processing the received signals is shown diagrammatically in FIG. 4. It is assumed that the total time duration of the signal is $T$ seconds, using the arrangement shown in FIG. 2. It will be further assumed that the signals to be processed have been passed through an analog-to-digital converter to sample the substantially continuous incoming signal at the geophone with a sampling interval of $\Delta t$ seconds. The desired center frequencies, though not necessarily those used, will range between a low value $f_1$ and upper value $f_2$. The actual parameters for the generated signal are determined from the following equations, in which the symbol *Int l is used to mean taking the integral part of the expression that follows this symbol.*

$N_t$ = desired number of samples = $Int\ (T/\Delta t)$.
$B$ = desired bandwidth = $f_2 - f_1$
$N_f$ = actual number of frequency components
 = $Int\ \sqrt{BN_t\ \Delta t + 0.5} + 1$
$k$ = number of samples in each frequency component $$= \text{Int}\left(\frac{N_t - 2}{B\Delta t}\right) + 0.5$$

$\Delta f$ = actual discrete frequency change from component to component = $1/(k\Delta t)$
$N_t'$ = actual number of samples = $kN_f$
$N$ = index of first frequency component = $Int\ (f_1/\Delta f)$
$M$ = index of last frequency component = $N + N_f - 1$
$f_1'$ = actual lower cutoff frequency = $N\Delta f$
$f_2'$ = actual upper cutoff frequency = $M\Delta f$
$B'$ = actual bandwidth = $f_2' - f_1'$ For example, suppose we want a pilot signal sampled at .001 second intervals, with the nominal parameters $T = 4.0$ seconds, $f_1 = 20$ hz., and $f_2 = 80$ hz. Using the above equations, we get
$N_t = Int\ (4.0/.001) = 4000$ samples
$B = 80 - 20 = 60$ hz.
$N_f = Int\ \sqrt{(60)(4000)(.001)} + 0.5) + 1 = 17$ $$k = \text{Int}\left(\frac{17. - 2}{(60)(.001)} + 0.5\right) = 250$$

$\Delta f = 1/(250)(.001) = 4$ hz.
$N_t' = (250)(17) = 4250$
$N = Int\ (20/4) = 5$
$M = 5 + 17 - 1 = 21$
$f_1' = (5)(4) = 20$ hz.
$f_2' = (21)(4) = 84$ hz.
$B' = 84 - 60 = 24$ hz.

Thus, the equations have given the parameters for a signal which was 4.25 seconds long and had frequency components in sets from 20 hz. to 84 hz.

Once such a signal has been decided upon it may be employed, with or without short time intervals between the various sets, as previously discussed. The received signal can then be processed either by the system shown in FIG. 1 or by the shown in FIG. 4. Here it is assumed that the signal from the geophone, suitably amplified, has been reduced to digital form by a digital-to-analog converter which samples the signal at the same interval of $\Delta t$ seconds. This signal first passes through a filter 40 which is of the type $(1-z^{-k})$. The filtered signal is then processed through a recursion filter (which can be described in z-transform theory, see for example "Theory of Sampled-Data Control Systems" by David P. Lindorff, John Wiley & Sons, Inc., New York, 1965, pp. 19—54 as $$F(z) = -(1-z^{-k})\sum_{n=N}^{M}\frac{\alpha_n z^{-(M-n)k}}{(1-2\beta_n z^{-1}+z^{-2})}$$

where
$\alpha n$ = sine $2\pi n\Delta f\Delta t$
$\beta n$ = cosine $2\pi n\Delta f\Delta t$.

The various filters employed are shown diagrammatically by the blocks 41 — 46. These, except for one, are followed as in the case of FIG. 1 by suitable delay units which in the theoretical case of FIG. 4 are shown as delaying the various frequency components by values of $k$, $2k$, $3k$, ... $(M - N)\ k$. In other words, the discussion on time delay in connection with FIG. 1 is appropriate to the equivalent situation in FIG. 4. After the appropriate delays, the various signals are summed by a summation unit diagrammatically shown as 52 and, if desired, are passed through a unit, phase-reversing amplifier 53, to produce an output which may then be recorded or further amplified as shown in FIG. 1. It is apparent that before recording, the output of this system is passed through a digital-to-analog converter to reconstitute an analogue trace, which can be recorded in any desired way known in seismic surveying.

It should be apparent without detailing that if the various sets of signals are not of uniform time duration but are of various durations $t_1$, $t_2$, $t_3$, etc. these signals can be processed by the system shown in FIG. 4 with one significant change. That is that the algorithm shown in FIG. 4 is replaced by that given immediately below.

$$F(z) = -\sum_{n=N}^{M}\frac{\alpha_n(1-z^{-k}n)z^{-\sum_{p=N+1}^{M}k_p}}{(1-2\beta_n z^{-1}+z^{-2})}$$

where $$k_p = \frac{t_p}{\Delta t}$$

It is further apparent that other changes may be made in this system without departing from the basic concept, which is best defined in the scope of the appended claims:

We claim:
1. A process for seismic surveying including the steps of:
   1. generating a seismic signal at a location, said signal comprising a substantially continuous succession of sets of waves, each set being made up substantially of a plurality of cycles of at least approximately a sine wave of a single frequency, the period of at least some of said sets differing from each other, each of said sets succeeding the preceding set within a time not greater than the duration of said succeeding set, whereby said signal propagates through the earth, reflecting from interfaces;
   2. receiving seismic waves due to said signal at a plurality of points removed from said location, including reflected waves, to produce a received signal corresponding to each of said points;
   3. narrowly filtering each said received signal by a plurality of filters each tuned to the fundamental frequency only of one of said sets of waves in said succession and appropriately delaying each such signal by a preselected time interval such that one-half cycle of each of said sets from a single reflection is in phase;
   4. combining the outputs of the delayed and filtered signals; and
   5. producing a visual record in accordance with the combined outputs of the delayed and filtered signals.

2. A process in accordance with claim 1, in which the time duration of each sine wave in said succession is at least approximately inversely proportional to the attenuation of seismic waves of this frequency in the earth, and the amplitude of all sine waves in said succession is substantially constant.

3. A process in accordance with claim 1, in which the time duration of each set in said succession is substantially equal, the amplitude of all sine waves in said succession is substantially constant, and the number of said sets at a particular frequency is at least approximately inversely proportional to the attenuation of seismic waves of this frequency in the earth.

4. A process in accordance with claim 1, in which the time duration of each set in said succession is substantially equal, the amplitude of all sine waves in said succession is at least approximately inversely proportional to the attenuation of seismic waves of this frequency in the earth, and the frequency of each of said sets is related to the next lower frequency in said sets by a common integral number.

5. A process in accordance with claim 1 in which each of said sets of waves after the first follows immediately after the preceding set.

6. A process in accordance with claim 1, in which the time duration of each set in said succession is substantially equal, the amplitude of all sine waves in said succession is substantially constant, the frequency of each of said sets is related to the next lower frequency in said sets by a common integral number, and in the combining step the initial polarity of at least about half of said sets is opposite from that of the rest of said sets.

7. A process in accordance with claim 4, in which each said preselected time interval is chosen such that said one-half cycle is substantially a center half cycle of each said set.

UNITED STATES PATENT OFFICE
CERTIFICATE OF CORRECTION

Patent No. 3,568,142            Dated March 2, 1971

Inventor(s) Ralph A. Landrum, Jr., et al.

It is certified that error appears in the above-identified patent and that said Letters Patent are hereby corrected as shown below:

Column 1, line 73, "form" should read -- from --. Column line 45, cancel "of one", first occurrence; line 69, beginnir with "the time duration" cancel all to and including "energy" column 3, line 34, and insert the same after "less than" in column 3, line 72; Column 3, line 59, "signal" should read -- not --. Column 4, line 13, "f-$_1$" should read -- $f_1$ --. Col 5, line 12, "f-$_{n-1}$" should read -- $f_{n-1}$ --; line 15, the symt after "frequency" should read -- $f_{n-2}$ --; line 18, "$f_n$" shoul read -- $t_n$ --. Column 7, line 19, after "Int" cancel "1"; lir 24, after "Int" insert -- ( --; line 36, after the second equals sign, the symbol should read -- $f_2'$ --; line 43, after "Int" insert -- ( --; line 65, "same" should read -- sample line 70, in the equation after the symbol "$z^{-k}$" insert -- ) --; same equation, subscript on the "β" should read -- r line 74, "αn" should read -- $α_n$ --; line 75, "βn" should read -- $β_n$ --. Column 8, line 14, "analogue" should read -- analog Signed and sealed this 22nd day of February 1972.

(SEAL)
Attest:

EDWARD M. FLETCHER, JR.            ROBERT GOTTSCHALK
Attesting Officer            Commissioner of Pate